Jan. 22, 1929. 1,699,891

J. HOPKIRK ET AL

MILKING MACHINE TEAT CUP

Filed Jan. 3, 1927

Inventors:
Joseph Hopkirk
and George William Gane
By
Attorney

Patented Jan. 22, 1929.

1,699,891

UNITED STATES PATENT OFFICE.

JOSEPH HOPKIRK, OF CAMBRIDGE, AND GEORGE WILLIAM GANE, OF NORMANBY, NEW ZEALAND.

MILKING-MACHINE TEAT CUP.

Application filed January 3, 1927. Serial No. 158,698.

This invention relates to the ordinary and well known type of teat cup for use in vacuum operated milking machines in which the teat cup is formed with an outer rigid casing and an inner flexible lining (generally of rubber) that is secured at its two ends respectively to the corresponding ends of the casing. In the working of the machine the inside space of this lining receives the teat of the cow inserted in its top end and has its lower end connected to the milking vacuum so that the milk drawn or expressed from the teat is carried away through such connection. The space between the lining and its casing is connected to a pulsator apparatus whereby through a regular alternate admission of air to such space and its withdrawal therefrom, the lining is caused to close around and squeeze the teat and then to release it and thus with the combined action of the vacuum suction on the teat, to effect the milking operation.

These cups are generally arranged in sets of four that have their milk pipe connections leading to tubular branches that extend from a milk pipe member of a claw. They have also their pulsator connections leading to other tubular branches of a second or pulsator pipe member of such claw. These pipe members are respectively connected with the vacuum-milk main and with the pulsation means so that the four cups work together. These features of construction and operation are well known in the art and require no further explanation.

The present invention has been devised with the object of providing improvements in the details of construction of the teat cup and in its manner of working by which the action of the cup in its milking operations is rendered more effective. These improvements are concerned more particularly with a special shape of flexible lining and with the means for mounting it in the casing. The improvements also relate to the combination with the cup, of means disposed within the vacuum milking system, by which the degree of vacuum acting within the inside of the lining is of less intensity than that acting on the outside during the periods at which the space outside is connected with the vacuum source. This will ensure that on the release of the lining's squeeze upon the teat, such lining will be drawn right out to effectually relieve the teat from all pressure. The teat will therefore be free to expand to let down its full quantity of milk under the suction of the milking vacuum.

The invention is illustrated in the accompanying drawings, in which:—

A is the teat cup casing which is made of approved metal and of cylindrical shape, open at its upper end and closed at its lower end, with the exception of a central circular opening B.

Figure 2:
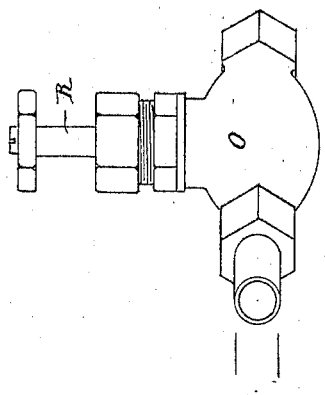
Figure 2 is a longitudinal section of the teat cup lining.
Figure 2:
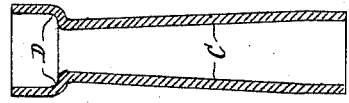
Figure 3:
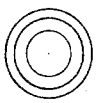
Figure 3 is a plan thereof.

C is the flexible lining made of rubber, also of cylindrical form, to extend longitudinally through the casing A in the well known manner. In this invention such lining is made of the shape shown in Figures 2 and 3, that is, with its wall made of uniform thickness throughout but with its diameter regularly decreasing from its lower end up to a point near its upper end and then enlarged beyond such point so as to form a shoulder D.

Figure 1:
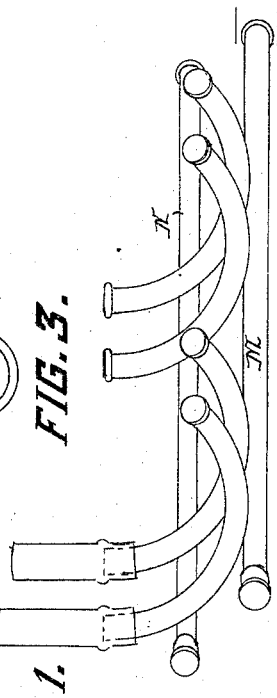
Figure 1 is a sectional elevation of a teat cup attached to its claw and showing also in elevation the means employed for varying the vacuum in the manner mentioned.

This shoulder D forms a bending point on which the enlarged upper end of the lining may be turned out and down over the top edge of the casing A, as shown in Figure 1, to provide for that end of the lining being attached to the casing, without stretching the lining sufficiently to destroy the tapered reduction of diameter at the upper end.

The bottom end of the lining is stretched over the cup shaped upper end E of a nipple fitting F, the tubular stem portion of which passes through the opening B of the casing bottom and has a nut $f$ screwed thereon to engage such bottom and draw the cup down round the opening edge to hold it and make an airtight seal. The lining is held closely round the cup by means of a ring G slipped up over its lower end.

The upper end of the lining is held on to the casing top by the fitting of a metallic or other suitable mouthpiece H thereon.

The lining is thus held in position in the casing and may be pulsated in the usual way to close in upon the teat, and to draw out therefrom. By reason of the special shape, the closing in upon the teat commences first at the top end and then works down towards the bottom end, and to make this action more effective and certain, the pulsator connection J is arranged to enter the casing side near its upper end, and such casing is made with an internal groove K extending round its surface into which the connection opens. This groove ensures that air will enter and be exhausted from all round the lining in the working of the cup. The lining is also prevented from closing upon the point of the teat by reason of the cup shaped end of the nipple fitting F so that the mouth of the teat duct is always maintained open.

The nipple F receives the connection F' by means of which the inside of the cup is connected to the milk tube M of the claw, and the pulsator connection J receives the tube J' by means of which attachment is made to the pulsator tube N of the claw, both in the well known way.

In order that the milking vacuum acting through the nipple F shall be of less intensity than that acting through the pulsator connection J, both being connected in the milking system with the same vacuum producing means, there is combined in the connection between such means and the milking pipe, a reducing valve O, placed at any approved point, but preferably at a point where the milk is not required to pass through it, as for instance beyond the milk receiver.

Figure 4:
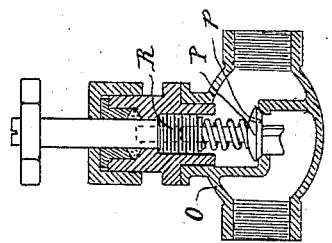
Figure 4 is a sectional elevation of the means used for varying the vacuum.

This valve O is made as shown in Figure 4, and is of the spring lift type having a spring controlled lifting valve proper P that is regulated in its closing force by means of the screw R. The vacuum acts through this valve to lift it and it is therefore checked to an extent governed by the tension placed on the valve spring. Consequently with this check in its range, the milking vacuum is reduced in intensity as compared with the unimpeded action through the pulsator connections and thus the lining C of each teat cup of the system will, when opening out, be drawn back closely against the wall of the casing A to open fully from the teat.

A small by-pass $p$ is formed in the valve P to ensure that a vacuum will always be maintained in the milking system. This may also be placed in the casing.

We claim:—

1. A milking machine teat cup, comprising a rigid cylindrical casing, a nipple mounted in the lower end of the casing and terminating within the same in a cup-shaped head, and a flexible lining of uniform thickness throughout disposed within the casing and having its lower end stretched over the nipple head; said lining having an unbroken surface both externally and internally and also having its diameter regularly decreasing from its lower end up to a point near its upper end where it is abruptly enlarged, such enlarged portion being turned outward and downward at said point over the top edge of the casing.

2. As a new article of manufacture, a flexible teat cup lining made of uniform thickness throughout and having its entire external and internal surface unbroken; the diameter of said lining regularly decreasing from the bottom of the lining to a point adjacent its top, beyond which it is abruptly enlarged to form an annular shoulder, such shoulder providing a bending line about which the enlarged portion may be turned outward and downward over the top edge of a teat cup casing to permit its attachment to the latter without stretching the lining sufficiently to destroy the tapered reduction of diameter.

In testimony whereof, we affix our signatures.

JOSEPH HOPKIRK.
GEORGE WILLIAM GANE.